(12) United States Patent  
Lee

(10) Patent No.: US 9,613,542 B2  
(45) Date of Patent: Apr. 4, 2017

(54) SOUND SOURCE EVALUATION METHOD, PERFORMANCE INFORMATION ANALYSIS METHOD AND RECORDING MEDIUM USED THEREIN, AND SOUND SOURCE EVALUATION APPARATUS USING SAME

(71) Applicant: Sung-Ho Lee, Incheon (KR)

(72) Inventor: Sung-Ho Lee, Incheon (KR)

( * ) Notice: Subject to any disclaimer, the term of this patent is extended or adjusted under 35 U.S.C. 154(b) by 0 days.

(21) Appl. No.: 14/646,994

(22) PCT Filed: Dec. 20, 2013

(86) PCT No.: PCT/KR2013/011926  
§ 371 (c)(1),  
(2) Date: May 22, 2015

(87) PCT Pub. No.: WO2015/030319  
PCT Pub. Date: Mar. 5, 2015

(65) Prior Publication Data  
US 2015/0287335 A1    Oct. 8, 2015

(30) Foreign Application Priority Data  
Aug. 28, 2013  (KR) .......................... 10-2013-0102159

(51) Int. Cl.  
*G09B 15/02* (2006.01)  
*G09B 15/00* (2006.01)  
(Continued)

(52) U.S. Cl.  
CPC ............. *G09B 15/023* (2013.01); *G09B 5/04* (2013.01); *G09B 15/02* (2013.01); *G10H 1/0041* (2013.01); *G10H 7/00* (2013.01)

(58) Field of Classification Search  
CPC .......... G09B 15/02; G09B 15/023; G09B 5/04  
(Continued)

(56) References Cited

U.S. PATENT DOCUMENTS 5,602,356 A  *  2/1997  Mohrbacher ........ G10H 1/0008  
                                                                  84/603  
5,990,404 A  *  11/1999  Miyano ............... G10H 1/0008  
                                                                  84/602  
(Continued)

FOREIGN PATENT DOCUMENTS

JP            11-024662 A           1/1999  
JP            11024662  A   *      1/1999  
(Continued)

*Primary Examiner* — David Warren  
*Assistant Examiner* — Christina Schreiber  
(74) *Attorney, Agent, or Firm* — Novick, Kim & Lee, PLLC; Sang Ho Lee; Jae Youn Kim

(57) ABSTRACT

A method and an apparatus for recording and evaluating a sound source are provided. The sound source evaluation method calculates a creativity index, which indicates a difference of a sound source property of test performance information with respect to a sound source property of reference performance information at a specific performing time, by comparing the test performance information, which is acquired by quantifying, according to passage of the performing time, a sound source property in a provided test sound source, with the reference performance information, which is acquired by extracting a sound source property and a sound source property having the same attribute according to passage of the performing time from a plurality of verified sound sources and then through a statistical analysis of the extracted properties.

11 Claims, 1 Drawing Sheet

(51) Int. Cl.
    *G09B 5/04* (2006.01)
    *G10H 1/00* (2006.01)
    *G10H 7/00* (2006.01)

(58) Field of Classification Search
    USPC .................................................. 84/477 R
    See application file for complete search history.

(56) References Cited

U.S. PATENT DOCUMENTS

| | | | | |
|---|---|---|---|---|
| 6,166,314 A * | 12/2000 | Weinstock | ............... | G10G 3/04 |
| | | | | 84/477 R |
| 6,333,455 B1 * | 12/2001 | Yanase | ................... | G09B 15/00 |
| | | | | 84/470 R |
| 6,751,439 B2 * | 6/2004 | Tice | ....................... | G09B 15/00 |
| | | | | 434/307 R |
| 7,129,407 B2 * | 10/2006 | Hiratsuka | ............ | G10H 1/0008 |
| | | | | 434/350 |
| 8,575,465 B2 * | 11/2013 | Rao | ........................ | G10H 1/363 |
| | | | | 84/477 R |
| 8,754,319 B2 * | 6/2014 | Yamada | ................. | G10H 3/146 |
| | | | | 463/7 |
| 2006/0005692 A1 * | 1/2006 | Moffatt | ................ | G10H 1/0083 |
| | | | | 84/645 |
| 2007/0234888 A1 * | 10/2007 | Rotolo de Moraes | . | G10H 1/361 |
| | | | | 84/730 |
| 2013/0070093 A1 * | 3/2013 | Rivera | ................. | G11B 27/002 |
| | | | | 348/143 |
| 2015/0046824 A1 * | 2/2015 | Humphrey | ............ | G06F 3/0481 |
| | | | | 715/727 |

FOREIGN PATENT DOCUMENTS

| | | |
|---|---|---|
| KR | 10-1996-0038700 A | 11/1996 |
| KR | 1998-0032961 A | 7/1998 |
| KR | 2001-0018740 A | 3/2001 |
| KR | 10-2001-0091798 A | 10/2001 |
| KR | 10-1221673 B1 | 1/2013 |
| KR | 10-2013-0068913 A | 6/2013 |

* cited by examiner

SOUND SOURCE EVALUATION METHOD, PERFORMANCE INFORMATION ANALYSIS METHOD AND RECORDING MEDIUM USED THEREIN, AND SOUND SOURCE EVALUATION APPARATUS USING SAME

TECHNICAL FIELD

The present invention relates to a method and an apparatus for recording and evaluating a sound source.

BACKGROUND ART

Even for those who have skillfully mastered a musical instrument, it has been common to learn new music through repeated practicing and playing. A practicing musician will aim to finish the musical performance by following the sheet music for the new music, without making mistakes. When the practicing musician can skillfully play the music later, the performer's intention is considered in the music and his or her interpretation of the music is considered in the musical performance. For those who have interest in a specific music genre or for professional musicians, a new impression comes from creativity in a musical performance with a subtle variation without significantly deviating from the scope of the original composition and a value thereof is highly rated.

For a beginner who practices new music, it has been necessary to receive training from an instructor with respect to a section of performance with mistakes and a technique for correct expression. Since such training from an instructor is repeated over a period of time, there is a disadvantage of having a longer training period with a higher cost.

There has been a study to replace such training from an instructor. In a related art, music performed by a performer has been analyzed using electrical signals and a result of the analysis has been compared with a music notation. Then, a training apparatus determines whether or not the performed music and the music notation are identical.

Since the training apparatus is limited to only a music notation, there is a limitation to learning artistic performance characteristics of masters or a subtle variation to the extent at a level without deviating from a fundamental framework of the original notation. That is, since the training method has excluded creative individual understanding with respect to the original music and is strictly forced to match completely with the music notation, the training without a judgment for an artistic value based on a subtle variation provided by a training professor has been achieved.

In Korean Patent Laid-open Publication No. 2001-0018740, a real-time music training system and a method of processing music information in the system thereof is disclosed, and Korean Patent Laid-open Publication No. 1998-0032961 discloses a music training system, a music training method, and a recording medium which records a program to realize the method thereof.

DISCLOSURE

Technical Problem

The present invention is directed to providing a deeper understanding of performed music and directed to quantitatively presenting various interpretations of music of a specific interest from professional performers.

The present invention is also directed to providing a training method improved from the related art to a beginner who learns a performance with respect to new music.

Other than the above, a detailed objective of the present invention will be clearly understood to those of ordinary skill in this technical field through detailed descriptions specified below.

Technical Solution

One aspect of the present invention provides a sound source evaluation method, the method compares test performance information obtained by quantifying sound source properties over a performing time from a test sound source which is provided, with reference performance information obtained by extracting and statistically analyzing sound source properties over the performing time from a plurality of sound sources which are qualified, which have the same attribute as the sound source properties over the performing time from the test sound source, and calculates a creativity index representing a difference of the sound source properties of the test performance information with respect to the sound source properties of the reference performance information in the performing time.

Here, the sound source properties may include at least one or more of a pitch, a beat, a level of dynamics, and musical performance technique information.

Further, the statistically analyzing may be a calculation of a central tendency of sound source properties extracted from the plurality of sound sources, or in addition, a calculation of dispersion with respect to the central tendency.

As a specific embodiment, the central tendency may be calculated from an arithmetic mean of sound source properties, and dispersion may be calculated from a standard deviation of sound source properties.

Meanwhile, a performance information analysis method which quantifies sound source properties extracted from a plurality of performance sound sources over a performing time and obtains reference performance information by statistically analyzing the sound source properties at each performing time, and a recording medium including reference performance information calculated thereby are provided.

Meanwhile, as an evaluation of creativity of a test sound source using sound source properties extracted from the test sound source over a performing time, a sound source evaluation apparatus including a matching unit configured to calculate a creativity index from a degree of difference between reference performance information, which is calculated by statistically analyzing sound source properties over the performing time from a plurality of sound sources which are qualified, and sound source properties of the test sound source is provided.

Here, the sound source evaluation apparatus may include a recognition unit sequentially configured to extract sound source properties from the test sound source over the performing time, generate test sound source information by quantifying the sound source properties which are extracted, and provide test sound source information based on a request from a matching unit.

Further, the sound source evaluation apparatus may include a reference analyzing unit which generates reference performance information, and the reference analyzing unit may include an extraction module which quantitatively calculates sound source properties over the performing time from the plurality of qualified sound sources and a first calculation module which calculates a central tendency based on each of the sound source properties, and a reference analyzing unit may include a second calculation module which extracts dispersion related to the central tendency from respective sound source properties calculated from the plurality of sound sources.

Advantageous Effects

According to an embodiment of the present invention, since reference performance information based on real performances of specialists instead of a standardized music notation is provided, valuable information including a degree of variation of the corresponding music can be provided to a user. Further, since an evaluation standard represented by a numerical value is used, a performance technique of a practicing performer can be quantitatively analyzed.

According to an embodiment of the present invention, a performance evaluation method and an evaluation apparatus bring a training level close to that of a professional instructor through allowance of a possibility of variously performing corresponding music, a quantitative comparison of performances of masters and his or her performance, or the like.

Other than the above, effects of the present invention will be clearly seen and understood by those of ordinary skill in this technical field through detailed descriptions specified below or during a process of implementing the present invention.

MODES OF THE INVENTION

Figure 1:
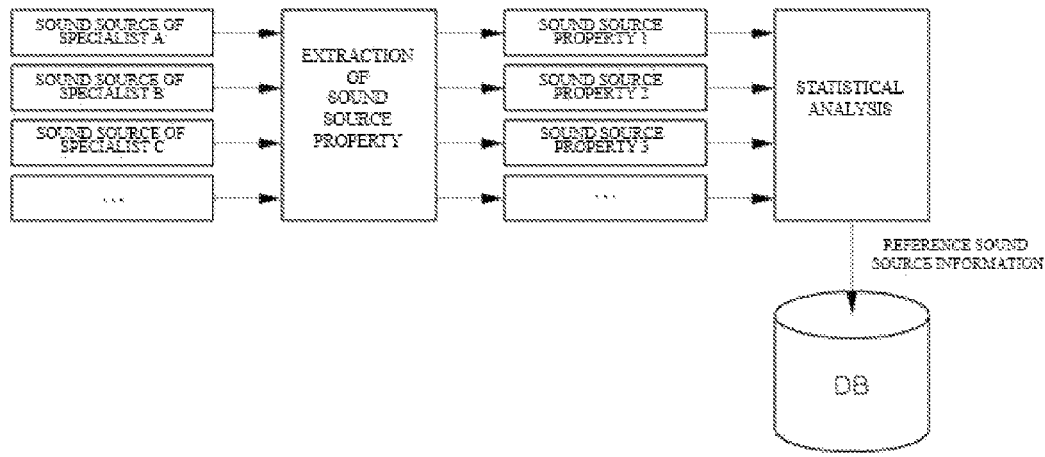
FIG. 1 is a block diagram schematically illustrating a performance information analysis method according to an embodiment of the present invention.
Figure 2:
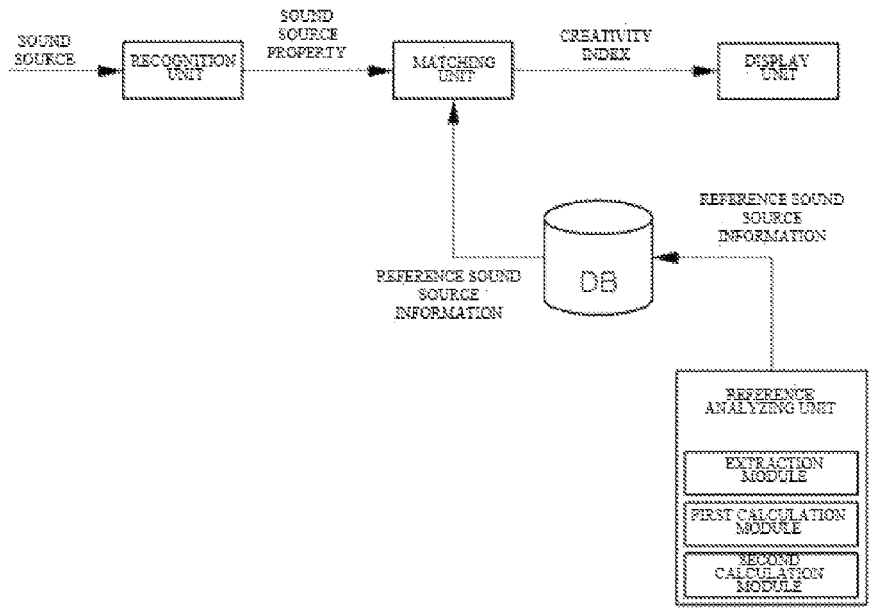
FIG. 2 is a block diagram illustrating a schematic configuration of a performance evaluation apparatus and a performance evaluation method according to an embodiment of the present invention.

Hereinafter, according to an embodiment of the present invention, a sound source evaluation method, a performance information analysis method and a recording medium used therein, and a configuration, functions, and an operation of a sound source evaluation apparatus using the same will be described with reference to the accompanying drawings. However, numerals in the drawings for the same or similar elements will be used in a unified manner.

The accompanying drawings illustrate adopted embodiments of the present invention, and the embodiments of the present invention should not be construed as limited to the accompanying drawings. From a viewpoint of those of ordinary skill in the art, when a part or all of the illustrations in the drawings is interpreted as irrelevant to a form, a shape, or a sequence inevitably required for the practice of the present invention, the present invention set forth by the appended claims is not limited thereby.

In the specification, when a certain part "comprises" an element, it will be understood such that the certain part is not excluding another element but further includes another element unless the text indicates otherwise. Further, the term " . . . unit", " . . . group", "module", or the like specified herein is understood as a unit processing at least one function or operation, and it may be realized by hardware, software, or a combination of the hardware and the software.

According to an embodiment of the present invention, the sound source evaluation method is a method of evaluating a result, that is, a sound source, which is generated in a performance by a performer.

A sound source produced through a musical instrument or a song includes a sound source property which is a component of music.

For example, the sound source property may include one or more of a pitch, a beat, dynamics, musical performance technique information, etc.

Here, the dynamics is expressed as sforzando, sforzato, forzato, fortepiano, sforzando-piano, or the like, and represents a relative volume of a particular sound with respect to an average level of a sound in a musical performance.

Further, the musical performance technique information refers to a performing technique variously performed through categories and types of musical instruments such as a woodwind instrument, a percussive string instrument, a bowed string instrument, and the like. For example, the woodwind instrument may express various musical images through articulation such that various performances on one measure depend on tonguing and a breathing technique, and for this, there are a non-legato technique, a legato technique, a portamento technique, a staccato technique, and the like. In another example, for a typical bowed string instrument such as a violin, there are various performing techniques to link sounds, such as a legato technique, a detache technique, a col legno technique, a sul ponticello technique, and the like, based on the handling of a bow.

A specific apparatus or a method for extracting a particular sound source property from a sound source according to the present invention may be realized using any widely known method. For example, in the case of a guitar tuner, the tuner receives a twanging sound from guitar strings and determines whether the twanging sound is the same as the intended sound or not. Some musical instruments equipped with a digital device such as an electric guitar may generate digital signals to play notes.

A test sound source which is a sound source for an evaluation may be received through a microphone or the like into which a user performs directly, or may be used from recorded sound. A recognition unit which calculates the sound source property from the test sound source may include a microphone configured to receive a sound source or a receiving module such as an electrical terminal configured to receive music from an external audio device. Further, the receiving module may receive a sound source through a communication network.

The recognition unit extracts the sound source property from a given sound source to be tested, quantifies the sound source property, and generates test performance information. Here, the extraction of the sound source property includes filtering a sound of interest from the given sound source through a filtering unit. As is well known, a filtering unit which reduces a residual noise except the sound of interest from a sound source may be used.

Here, the sound of interest refers to a particular sound targeted for an evaluation in the given sound source. For example, when an ensemble includes a piano and some wind instruments, only a piano melody is selectively extracted from ensemble sound sources received through the receiving module.

Further, in a process of extracting the sound source property, an additional sound source process such as a sound range adjustment control, a tonal adjustment control, or the like may be added.

The extracted sound source property is output as test sound source information in terms of a numerical value to distinguish differences in size through a process of quantification. When sound source property consists of one type, the test sound source information is output as one numerical value. However, as in the case of evaluating both a pitch and a beat, when two types or more are extracted and quantified, the test sound source information is output as a vector.

In this case, test sound source information generated from a test sound source is sequentially extracted over a performing time. Here, the performing time may be in a unit indicating the passage of time in seconds, or in a unit indicating a flow of a measure in a music notation of the corresponding music.

When a test sound source is generated based on professional background sound which already exists, a real time unit may be treated as performing time.

In the most cases, even for the same music, the time from the beginning of the music until the end, that is running time, is slightly different for each performer, and thus it may be preferred to set a degree of measure progression in a music notation as a reference to the performing time.

The recognition unit keeps the generated test sound source information and provides the test sound source information to a matching unit when a request is made from the matching unit to be described below.

Meanwhile, a sound source property for an evaluation reference is needed to compare the quantitatively extracted sound source property from the test sound source. The sound source property is output through a reference analyzing unit and stored as reference performance information.

The reference analyzing unit may be included in a sound source evaluation apparatus, or may be a separate standalone apparatus. For example, the reference analyzing unit is independently included in a sound studio and may be configured to collect and analyze a sound source property as an evaluation reference and have a sound source evaluation apparatus to keep only an output result based on a result thereof.

A sound source to be processed by the reference analyzing unit is selected from sound sources in which performer's technique is qualified. Since a reliability of a sound source selected for an analysis from the reference analyzing unit is directly related to accuracy and credibility of the evaluation standard, a plurality of sound sources acknowledged as correctly performed or acknowledged as an excellent performance are preferred. A qualified sound source may be commercially obtained. For example, in the case of classical music, a musical performance CD having various versions with respect to particular music by a famous composer is marketed. Further, a qualified sound source may be obtained through public media such as the Internet, a radio, and a television. In the case of a song, a plurality of singers tend to perform the song repeatedly over a long period of time, and thus a sound source may be collected from a live album or a concert hall.

In terms of the configuration thereof, the reference analyzing unit includes an extraction module, a first calculation module, and a second calculation module. Here, the second calculation module may be omitted in some cases.

The extraction module quantitatively calculates a sound source property from a qualified sound source over the performing time. A configuration and operation of the extraction module is actually the same as the configuration and operation of the above-described recognition unit. Thus, the extraction module and the recognition unit may be interchangeable.

As described above, when the recognition unit is configured to process an additional sound source process such as the sound range adjustment control, the tonal adjustment control, or the like with respect to the extracted sound source property, it may also configure the extraction module to process the additional sound source process.

However, when the additional sound source process performed in the recognition unit is irrelevant to the sound source property to be evaluated, an additional sound source process may be omitted or added in the extraction module. For example, when the sound source property to be evaluated is a beat, a sound source process of controlling a tone may be performed in either the recognition unit or the extraction module.

The first calculation module and the second calculation module are units for statistically analyzing a sound source property obtained from a plurality of sound sources and generating reference performance information.

Here, since the sound source property is always extracted over a performing time, a plurality of pieces of reference performance information processed therefrom is also calculated over the performing time.

Statistical analysis is a process of calculating sound source properties extracted at a specific performing time from a plurality of sound sources into one numerical value by compiling statistics.

Specialists having different interpretations with respect to a single piece of music modify the original music through their creative performances. The change of such music is considered in a transformative performance (as known as variation), and a sound source property variously transformed at a particular section of the music is converted into a statistical value. Here, a specialist may be a group as well as an individual.

As in the related art, when a music notation itself has been set as the evaluation standard, a simplified evaluation standard according to the intent of an original composer is obtained. However, according to an embodiment of the present invention, by statistically analyzing sound sources from a plurality of specialists' performances, a transformation of music which is acknowledged and accepted at level of the specialists may be recognized.

In particular, according to a chronological or source-specific category of a sound source which generates reference performance information, a chronological history of changes in performing techniques, a prevalent musical feature, a variation of music interpretation, or the like may be recognized, and a regional performance property or the like may be recognized.

A beginner who learns a relevant music from the beginning may understand personal expressions frequently used by specialists, and deeply understand the corresponding music. In addition, the beginner may produce a new creative performance by adding his or her unique understanding.

As described above, an understanding of creativity obtained by analyzing a performance of a specialist and a confidence of realizing a level in which the interpretation of music made by the beginner himself or herself is widely accepted are considered close to the result of learning high level lessons from a professional instructing professor.

Further, statistical analysis is needed for calculating a sound source property having a plurality of sound sources from a specialist's performances into one piece of quantitative data. Since a numerical size difference between a sound source property extracted from a test sound source obtained from a performance of the beginner and reference performance information may be calculated, it may analyze tangibly with respect to the quantitative sound source property in the corresponding performing time. Further, a numerical result of judgment, instead of making a dichotomous judgment between right and wrong on a performance of the beginner, proposes a quantitative judgment on an amount of deviation, and the beginner may make a better self-evaluation.

As a specific example with respect to statistical analysis, a first calculation module may calculate a central tendency from respective sound source properties which are calculated from qualified sound sources obtained from a plurality of specialists.

A central tendency refers to a tendency of a plurality of values of the sound source properties obtained in a specific performing time to gravitate toward a certain value of the sound source property. Specifically, when the values of the sound source properties originated from performances of a plurality of specialists in the specific performing time are variously distributed, a particular value representing the values of the sound source properties is calculated.

The following examples calculate the central tendency.

An arithmetic mean is calculated by adding each value of the sound source property and then dividing by the number of sound source properties. In the case of using an arithmetic mean, a few sound source properties greatly deviating from the mean has a great influence on a mean value, and thus, a collection of sound sources obtained from as many specialists as possible may be preferred. Further, as the interpretation of music is allowed to be relatively free, it is very important in an analysis of a sound source in a music genre having a great variation by specialist. Accordingly, reference performance information in which the central tendency is calculated from the arithmetic mean may be more suitable to a specialized learner than a beginner.

As another example, the central tendency may be output as a mode from a plurality of sound source properties. The mode indicates applying sound source properties obtained from a performance acknowledged by a plurality of specialists. Thus, a reliable evaluation standard widely acceptable for beginners may be presented.

In addition, the central tendency may be calculated by various methods such as median, geometric mean, harmonic mean, etc.

A second calculation module calculates the dispersion which supplements the central tendency of the first calculation module in statistical analysis. Here, the dispersion indicates a degree of variance with respect to the central tendency adopted by the first calculation module.

The dispersion provides a degree of variance of sound source properties obtained from a performance of a plurality of specialists, and presents information related to a diversity of music interpretation with respect to a music notation of corresponding music.

Specifically, a diversity of sound source properties in a specific performing time may be greater than a diversity of sound source properties in just before the specific performing time, and it may be difficult to completely deliver information with respect to a degree of diversity only by the above-described central tendency. As the sound source property having a greater diversity in the performing time is notification of a broad range of allowable creative performance by a performer who provided a test sound source, a performer studying a music notation may have a further musical understanding of the corresponding music.

Further, the dispersion of a corresponding sound source property is taken into account by a sound source evaluation method, and a better quality of evaluation may be provided to a performer. For example, the dispersion of the sound source property is considered, and when dispersion is greater in the specific performing time and even when the sound source property of a test sound source has a great difference from the reference performance information, the difference therefrom may be determined to have a range that can be accepted rather than being performing incorrectly. Thus, an intermediate player trying to be at a level of a specialist who is aggressively exposing individuality in performance may be correctly evaluated with respect to his or her performance.

For example, dispersion may be determined by utilizing various calculation methods such as variance, a standard deviation, a median absolute deviation, etc.

In the case of the sound source properties based on statistical analysis by the first calculation module, reference performance information is stored as a vector value based on the number of sound source properties to be analyzed. Further, the dispersion of the second calculation module is also added to the reference performance information as a vector value based on the number of sound source properties. Here, since sound source properties are calculated in every performing time, reference performance information is formed with a plurality of vector values based on a length of performing time.

Generated reference performance information is stored in a recording medium such as a database or the like. The reference performance information stored in the recording medium is categorized by repertoire, and sound source properties statistically processed based on performing time are specified for each repertoire. A vector value is stored based on the number of sound source properties for each repertoire, and when a central tendency and dispersion are included, a respective vector value exists.

Even for the same repertoire, reference performance information having a different method of calculating a central tendency and a method of calculating dispersion may be included. As described above, in a recording medium configured to keep various types of reference performance information, a matching unit to be described below is connected thereto and receives the necessary reference performance information.

The matching unit compares the sound source property extracted by the recognition unit with performing time-specific reference performance information, and calculates a creativity index showing a difference therebetween.

The a creativity index uses various methods to determine a difference between the reference performance information and the test performance information in the same performing time, and a size of a result value indicates a difference between the reference performance information and the test performance information. That is, when a numerical value of the creativity index is large, it may be interpreted as either a performer incorrectly performed the music or greatly demonstrated creativity.

A method of finding the above-described creativity index may be variously expressed. Equation 1 below is one of the methods for determining a creativity index in a simple form.

$$R(t) = \text{abs}(b - a) \qquad \text{Equation 1}$$

In Equation 1, R(t) represents a creativity index in performing time t. abs( ) is a function calculating an absolute value for each element with respect to a vector value in the parentheses, b is reference sound source information in the corresponding performing time t, and a is test sound source information in the same performing time. Here, b uses a central tendency among the reference sound source information to obtain a meaningful creativity index. Equation 1 expresses a difference between the sound source property from performances of specialists and the sound source property from a performance of a performer in the specific performing time t as an absolute value.

Equation 1 which is relatively simple is important when a plurality of sound source properties need to be calculated within a short time. Specifically, Equation 1 is used in overall analysis of a plurality of sound source properties in a music performance having a fast tempo, and thus, the burden of an arithmetic apparatus in the matching unit may be reduced.

Another exemplary example of determining a creativity index is expressed by Equation 2 below.

$$R(t) = \text{abs}(\text{div}(b-a, s)) \quad \text{Equation 2}$$

In Equation 2, R(t) indicates a creativity index in performing time t. abs( ) is a function calculating an absolute value for each element with respect to a vector value in the parentheses, and b is a value for a central tendency of sound source properties extracted from the plurality of sound sources. Further, s is a value for dispersion related to a central tendency of sound source properties extracted from the plurality of sound sources, and a is a value of a sound source property calculated from the test sound source. div(X,Y) is an operator configured to divide vector X and vector Y into element Xn and element Yn respectively and perform an element-specific division.

Since a central tendency and dispersion are considered in Equation 2, Equation 2 may be distinguished from Equation 1 in terms of an evaluation of a test sound source influenced by a degree of diversity in music interpretation of existing specialists.

Specifically, since sound source properties have a large variation of numerical values in a section having various interpretations of specialists, a large numerical value for dispersion is calculated. Thus, a difference value of a corresponding sound source property divided by large dispersion has a creativity index smaller than the above-described Equation 1.

That is, when a creativity index is evaluated as low from the sound source property having a tolerance of diversity, a performer may be informed that his or her own performance in a range of music is within a tolerance or creativity is not acknowledged to be at a high level.

On the other hand, a part having a small value of dispersion in the statistical analysis of the sound source of specialists is the part having a small tolerance of variation, and it may be seen as a sound source property of a performance widely used by the specialists and is almost uniform. In the case of above-described part, when a difference between reference performance information and test performance information is large, it indicates a high possibility of a performer performing undesirably. When a small value of dispersion is applied in Equation 2, the corresponding creativity index has a calculation result greater than that of Equation 1 and a possibility of the creativity index meaning that a performer makes a mistake in a performance may be increased.

Thus, dispersion is further considered in Equation 2, and diversity of musical interpretation in a corresponding performing time may effectively contribute to an evaluation of a sound source.

The matching unit may have a real-time process of a creativity index of a test sound source over a performing time. A creativity index calculated using a stream processing method is provided in real-time to a performer during a performance, and it may have the same effect as getting real-time on-site training in a place of playing a musical practice.

The matching unit may calculate the test sound source information using a batch processing mode after the recording of test sound source is completed. This is a leading method for calculating a creativity index on various sound source properties while having a test sound source from a large scale ensemble such as an orchestra.

As an additional function of the matching unit, a sectional evaluation index evaluated from the complete music or a sectional sound source in a predetermined section may be calculated. In Equation 3 below, a sectional evaluation index D is calculated by sequentially arranging a plurality of creativity indices calculated at a performing time t, into a matrix to calculate the matrix M, and linearly combining through a method of multiplying a row vector, a matrix W, a vector having a weighted value added thereto, or a matrix configured to linearize matrix M.

$$M = (R(t_0) R(t_1) R(t_2) \ldots )$$

$$D = MW \quad \text{Equation 3}$$

The sectional evaluation index D may be calculated based on a usage of the index when a scalar value instead of a vector value is required.

A sectional evaluation index for the complete music is useful when overall creativity evaluation of certain music is performed.

Further, a sectional evaluation index for a predetermined measure may help to determine a performing section in which a user suffers from making a mistake while performing music, and a performing section which may be highly rated for a creative performance.

Meanwhile, a creativity index or a section evaluate index calculated from the matching unit is presented to a user through a display unit.

The display unit may be a display apparatus configured to display a calculated creativity index as a number or an image.

As an example for displaying a creativity index as an image, a central tendency and dispersion of reference sound source information are displayed with different sizes of diameters on concentric circles and displayed at locations deviated from reference sound source information based on a size of test performance information, and the creativity index may be intuitively recognized. Further, the reference performance information, test performance information, and creativity index may be displayed in one graph over the performing time. Further, various methods of displaying images may be used for easy recognition by a performer.

Alternatively, a display unit may include a sound apparatus configured to generate sound with a different pitch or tone based on a level of a creativity index.

A display unit may provide tactile recognition to a performer through a feeling in addition to the visual recognition or acoustic recognition. Thus, an output method of a display unit has no limitation.

A minimum configuration for a sound source evaluation apparatus includes a matching unit. The matching unit is provided through a general-purpose terminal device such as a smartphone or through a separate digital process apparatus, and test sound source information and reference sound source information may be transmitted to a terminal device having a matching unit through a communication network.

Further, a creativity index calculated from a terminal device may be transmitted to a separate display unit through a network.

Alternatively, a sound source evaluation apparatus may include both a matching unit and a display unit. A general-purpose terminal device such as a smartphone is an example of the above description. Test sound source information and reference sound source information may be received through a communication network, and a creativity index calculated in a matching unit may be expressed through a display screen, a sound from a speaker, a pattern or strength of vibration, or the like.

Alternatively, a sound source evaluation apparatus may include all of a matching unit, a display unit, and a database having reference sound source information, or additionally, may further include a recognition unit configured to calculate test sound source information from a test sound source.

Furthermore, a sound source evaluation apparatus may include a recognition unit, a reference analyzing unit, a matching unit, a display unit, and reference sound source information. In this case, an extraction module of a reference analyzing unit may be used as a substitute for the recognition unit.

Hereinafter, a performance information analysis method and a sound source evaluation method according to an embodiment of the present invention will be described in detail.

First, a performance information analysis method quantifies a sound source property extracted from a performance sound source over a performing time, statistically analyzes sound source properties obtained from a plurality of pieces of performance information, and generates reference performance information.

For example, sound sources from performances of specialists are obtained by released albums with respect to a particular repertoire from four professional performers or by broadcasting a sound source obtained from a performance through a live Internet broadcast.

If each of professional performers perform a particular sound at measure 12.4, then each specialist perform faster than a previous measure by 4%, 5%, 7%, and 4%. Assuming that each sound source property was extracted, quantified, and calculated, and when a central tendency b is calculated using a method of obtaining an arithmetic mean compared to a previous measure, a tempo of a performance at measure 12.4 was 5% faster than a previous measure. This is stored as reference performance information having the following form.

$$a(12.4)=5$$

For example, it could be set to use a standard deviation to determine dispersion in the second calculation module. When an example with respect to the above-described tempo is applied, a standard deviation with respect to the tempos of the four specialists at measure 12.4 is determined to be 1.41421. Accordingly, a description of dispersion s having the following form is added to reference performance information.

$$s(12.4)=1.41421$$

The above example describes only one type of a sound source property with respect to a tempo.

In addition to the above example, both tempo at measure 12.4 and pitch of a representative sound set as sound source properties are described as below.

It is assumed that an audio property with respect to a tempo is the same as the above-described example, and pitches of the representative sound at which the four specialists performed at the corresponding measure are represented differently as 441 Hz, 440 Hz, 447 Hz, and 440 Hz.

Accordingly, a central tendency calculated with an arithmetic mean with respect to a pitch of the representative sound at measure 12.4 is 442, and a standard deviation thereof is 3.36650. Thus, reference performance information is stored as the following vector form.

$$a(12.4) = \begin{pmatrix} 5 \\ 442 \end{pmatrix}$$

$$s(1.4) = \begin{pmatrix} 1.41421 \\ 3.36650 \end{pmatrix}$$

As described above, when a plurality of sound source properties are selected, reference performance information is stored in a vector form having as many columns as the number of sound source properties. Further, since a sound source property is determined in every performance time, a different type of audio property is stored as an element value of vector in the reference performance information.

Meanwhile, test sound source information generated by processing the test sound source in a recognition unit is formed to have the same format as the above-described reference performance information and transmitted to a matching unit. For example, an analysis result of the test sound source obtained from a performance of a performer with respect to the same music shows that a tempo of a performance at measure 12.4 was 8% faster than a previous measure. Further, when a pitch of the representative sound was 439 Hz, test sound source information b is calculated based on the following form.

$$b(12.4) = \begin{pmatrix} 8 \\ 439 \end{pmatrix}$$

Meanwhile, in a matching unit, when a creativity index is calculated based on Equation 2 described above, a creativity index R is calculated below.

$$R(12.4) = \text{abs}\left(div\left(\begin{pmatrix} 8 \\ 439 \end{pmatrix} - \begin{pmatrix} 5 \\ 442 \end{pmatrix}\right), \begin{pmatrix} 1.41421 \\ 3.36650 \end{pmatrix}\right)$$

$$R(12.4) = \begin{pmatrix} 2.12133 \\ 0.89113 \end{pmatrix}$$

In the above-described creativity index at a performance time of measure 12.4, a creativity index with respect to a tempo is 2.12133, and a creativity index with respect to a pitch of a representative sound is calculated to be 0.89113.

The above creativity index is calculated at every performance time, and a performer may be quantitatively evaluated for performing incorrectly or expressing creatively through a fluctuation tolerance of a creativity index.

A creativity index consisting of a plurality of sound source properties is output as a vector value of a length based on the number of sound source properties, which is recognition criteria, and is required to be used as a scalar value based on a usage of a creativity index. To this end, as shown in Equation 4 below, a creativity index R(t) output as a vector value is multiplied by vector E which generates a scalar value, and thus, scalar value r(t) is calculated.

$$r(t) = FR(t) \quad \text{Equation 4}$$

Here, a vector is set each element value of the vector to 1, or assigned an element-specific weighted value.

For example, the creativity index R (12.4) calculated from the above-described example has a weighted value of 0.9 with respect to a tempo, and may be converted into a scalar value through vector E in consideration of a weighted value of 1.1 into account with respect to a sound pitch.

$$r(12.4) = ER(12.4) = (0.9 \ 1.1)\begin{pmatrix} 2.12133 \\ 0.89113 \end{pmatrix} = 2.88944$$

The invention claimed is:

1. A sound source evaluation method, comprising:
comparing test performance information obtained by quantifying sound source properties over a performing time from a test sound source which is provided, with reference performance information obtained by extraction and statistical analysis of sound source properties over the performing time from a plurality of sound sources which are qualified, which have the same attribute as the sound source properties over the performing time from the test sound source; and
calculating a creativity index representing a difference of the sound source properties of the test performance information with respect to the sound source properties of the reference performance information in the performing time.

2. The method of claim 1, wherein the sound source properties includes at least one or more of a pitch, a beat, a level of dynamics, and musical performance technique information.

3. The method of claim 1, wherein the statistical analysis is to calculate a central tendency of the sound source properties extracted from the plurality of sound sources.

4. The method of claim 1, wherein the statistical analysis is to calculate a central tendency of the sound source properties extracted from the plurality of sound sources, and to calculate dispersion with respect to the central tendency.

5. The method of claim 4, wherein the central tendency is calculated from an arithmetic mean of the sound source properties, and the dispersion is calculated from a standard deviation of the sound source properties.

6. The method of claim 1, wherein the creativity index is calculated by Equation 1 below:

$$R(t) = \text{abs}(b-a) \quad \text{[Equation 1]}$$

In Equation 1, R(t) is a creativity index at a performing time t, abs( ) is a function configured to calculate each element-specific absolute value with respect to a numerical value in the parentheses ( ), b is a central tendency value of sound source properties extracted from the plurality of sound sources which are qualified, and a is a sound source property value calculated from the test sound source.

7. The method of claim 1, wherein the creativity index is calculated by Equation 2 below:

$$R(t) = \text{abs}(\text{div}(b-a,s)) \quad \text{[Equation 2]}$$

In Equation 2, R(t) is a creativity index at a performing time t, abs( ) is a function configured to calculate each element-specific absolute value with respect to a numerical value in the parentheses ( ), b is a central tendency value of sound source properties extracted from the plurality of sound sources, s is a dispersion value related to a central tendency of sound source properties extracted from the plurality of sound sources which are qualified, a is a sound source property value calculated from the test sound source, div(X,Y) is an operator configured to perform an element-specific division of element Xn of vector X and element Yn of vector Y.

8. A sound source evaluation apparatus which evaluates creativity of a test performance information using sound source properties extracted from the test sound source over a performing time, comprising a matching unit configured to calculate a creativity index from a degree of difference between reference performance information, which is calculated by statistical analysis of sound source properties over the performing time from a plurality of sound sources which are qualified, and sound source properties of the test sound source.

9. The apparatus of claim 8, comprising a recognition unit sequentially configured to extract the sound source properties from the test sound source over the performing time, generate test sound source information by quantifying the sound source properties which are extracted, and provide the test sound source information based on a request from the matching unit.

10. The apparatus of claim 8, comprising a reference analyzing unit configured to generate the reference performance information, wherein the reference analyzing unit comprises:
an extraction module configured to calculate sound source properties quantitatively over the performing time from the plurality of sound sources which are qualified; and
a first calculation module configured to calculate a central tendency based on each of the sound source properties.

11. The apparatus of claim 10, wherein the reference analyzing unit includes a second calculation module configured to extract dispersion related to the central tendency from respective sound source properties calculated from the plurality of sound sources.

* * * * *